(12) United States Patent
Santhanankrishnan

(10) Patent No.: US 8,149,696 B2
(45) Date of Patent: Apr. 3, 2012

(54) METHODS AND SYSTEM FOR ADMISSION CONTROL AND SCHEDULING IN AD HOC WIRELESS NETWORKS

(75) Inventor: Anand Santhanankrishnan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 930 days.

(21) Appl. No.: 11/322,651

(22) Filed: Jan. 3, 2006

(65) Prior Publication Data

US 2006/0176813 A1    Aug. 10, 2006

(30) Foreign Application Priority Data

Dec. 31, 2004    (IN) .................. 1486/CHE/2004

(51) Int. Cl.
 *G01R 31/08* (2006.01)
 *G06F 15/173* (2006.01)
(52) U.S. Cl. ...................... 370/230; 709/240
(58) Field of Classification Search .............. 370/230
 See application file for complete search history.

(56) References Cited

U.S. PATENT DOCUMENTS

| | | | | |
|---|---|---|---|---|
| 5,878,026 | A * | 3/1999 | Greenberg et al. | 370/230 |
| 6,934,249 | B1 * | 8/2005 | Bertin et al. | 370/218 |
| 7,221,656 | B1 * | 5/2007 | Aweya et al. | 370/252 |
| 2003/0101286 | A1 * | 5/2003 | Kolluri et al. | 709/316 |
| 2004/0013089 | A1 * | 1/2004 | Taneja et al. | 370/235 |
| 2004/0136324 | A1 * | 7/2004 | Steinberg et al. | 370/238 |
| 2005/0138165 | A1 * | 6/2005 | Tang et al. | 709/224 |
| 2006/0031576 | A1 * | 2/2006 | Canright | 709/240 |
| 2007/0110061 | A1 * | 5/2007 | Sisodia et al. | 370/390 |

* cited by examiner

*Primary Examiner* — John Blanton

(74) *Attorney, Agent, or Firm* — Roylance, Abrams, Berdo & Goodman, LLP

(57) ABSTRACT

Methods and system for admission control and scheduling in ad hoc wireless networks are provided. The method for admission control and scheduling in ad hoc wireless networks for different class of flows C1, C2 and C3 is provided where said admission control mechanism evaluate the probability of QoS violation and admit those calls whose probability of QoS violation is below a specified threshold. Admission Control for Class C1 evaluates the probability where destination node is a one-hop neighbor of the source node. Admission Control for Class C1 evaluates the probability where source and destination nodes are not one hop neighbors. Admission Control for Class C2 and class C3 flows evaluates the average or mean delay requirement and a requirement on the rate. Scheduling class C1 flows when admitted flows violate the QoS requirements; and Scheduling class C2 and class C3 flows.

24 Claims, 5 Drawing Sheets

Figure 2:
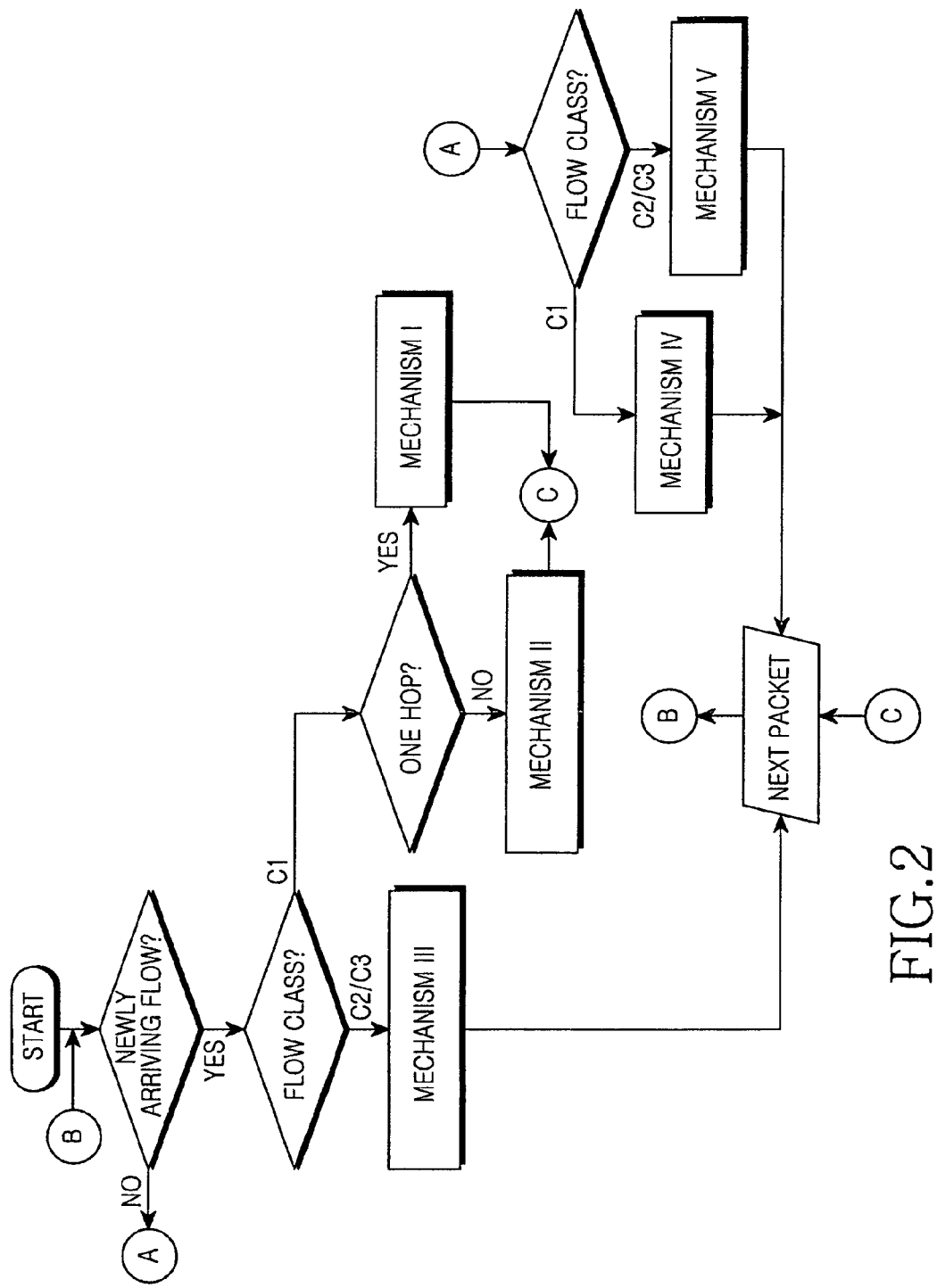

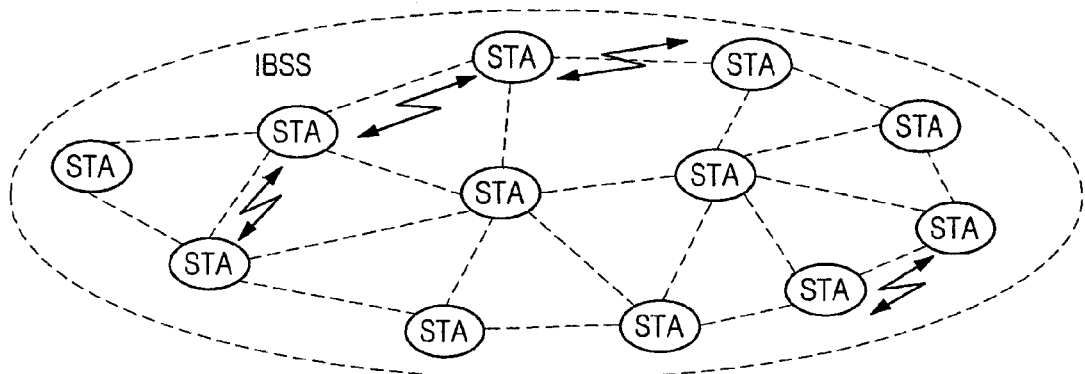
FIG.1
(CONVENTIONAL)

| TYPE VALUE B3 B2 | TYPE DESCRIPTION | SUBTYPE VALUE B7 B6 B5 B4 | SUBTYPE DESCRIPTION |
|---|---|---|---|
| 00 | MGNAGEMENT | 0000 | ASSOCIATION REQUEST |
| 00 | MGNAGEMENT | 0001 | ASSOCIATION RESPONSE |
| 00 | MGNAGEMENT | 0010 | REASSOCIATION REQUEST |
| 00 | MGNAGEMENT | 0011 | REASSOCIATION RESPONSE |
| 00 | MGNAGEMENT | 0100 | PROBE REQUEST |
| 00 | MGNAGEMENT | 0101 | PROBE RESPONSE |
| 00 | MGNAGEMENT | 0110-0111 | RESERVED |
| 00 | MGNAGEMENT | 1000 | BEACON |
| 00 | MGNAGEMENT | 1001 | ANNOUNCEMENT TRAFFIC INDICATION MESSAGE (ATIM) |
| 00 | MGNAGEMENT | 1010 | DISASSOCIATION |
| 00 | MGNAGEMENT | 1011 | AUTHENTICATION |
| 00 | MGNAGEMENT | 1100 | DEAUTHENTICATION |
| 00 | MGNAGEMENT | 1101-1111 | RESERVED |
| 01 | CONTROL | 0000-1001 | RESERVED |
| 01 | CONTROL | 1010 | POWER SAVE(PS)-POLL |
| 01 | CONTROL | 1011 | REQUEST TO SEND (RTS) |
| 01 | CONTROL | 1100 | CLEAR TO SEND (CTS) |
| 01 | CONTROL | 1101 | ACKNOWLEDGMENT (ACK) |
| 01 | CONTROL | 1110 | CONTENTION-FREE (CF)-END |
| 01 | CONTROL | 1111 | CF-END + CF-ACK |
| 10 | DATA | 0000 | DATA |
| 10 | DATA | 0001 | DATA + CF-ACK |
| 10 | DATA | 0010 | DATA + CF-POLL |
| 10 | DATA | 0011 | DATA + CF - ACK - CF-POLL |
| 10 | DATA | 0100 | NULL FUNCTION (NO DATA) |
| 10 | DATA | 0101 | CF - ACK (NO DATA) |
| 10 | DATA | 0110 | CF - POLL (NO DATA) |
| 10 | DATA | 0111 | CF - ACK + CF-POLL (NO DATA) |
| 10 | DATA | 1000-1111 | RESERVED |
| 11 | RESERVED | 0000-1111 | RESERVED |

FIG.5

METHODS AND SYSTEM FOR ADMISSION CONTROL AND SCHEDULING IN AD HOC WIRELESS NETWORKS

CROSS-REFERENCE TO RELATED APPLICATIONS

This application claims the benefit under 35 U.S.C. §119(a) of an Indian Patent Application No. 1486/CHE/2004 filed on Dec. 31, 2004, the entire contents of which are hereby incorporated by reference.

BACKGROUND OF THE INVENTION

1. Field of the Invention

This invention relates generally to the field of wireless communication and specifically to ad hoc wireless networks. More particularly, the present invention relates to methods and system for admission control and scheduling in ad hoc wireless networks.

2. Description of the Related Art

A schematic diagram of a typical wireless network is shown in FIG. 1. Here, STA represents a mobile station, also known as a mobile terminal. The physical layer (PHY) and medium access control (MAC) standard for this type of networks are described in "Wireless Local Area Networks, Medium Access Control (MAC) and Physical Layer (PHY) Specifications," ANSI/IEEE Std 802.11, 1999 Edition. The basic access mechanism specifies two protocols of medium access, the point co-ordination function (PCF) and the distributed co-ordination function (DCF). The DCF medium access is the mode used for the ad hoc mode of operation and carrier sensing multiple access with collision avoidance (CSMA/CA) is the multiple access mechanism. A four way handshake of request to send (RTS), clear to send (CTS), DATA and acknowledgement (ACK) is used for collision avoidance.

The DCF MAC protocol does not provide any priority to any form of traffic, and hence, does not support quality of service (QoS). The IEEE 802.11e standard for QoS enhancements (see "Wireless LAN Medium Access Control (MAC) and Physical Layer (PHY) Specifications, MAC Quality of Service (QoS) Enhancements," IEEE P 802.11e/D 8.0, February 2004) specifies an enhanced DCF (EDCF) mode of operation defining 4 types of access categories (AC). The DCF inter-frame spacing (DIFS) time for clear channel assessment was modified to having a different arbitration inter-frame spacing (AIFS) for clear channel assessment corresponding to each access category. The 802.11e draft also specifies different values of the contention window size corresponding to different access categories, thereby providing the traffic with higher priority, a higher probability of obtaining a transmission opportunity (TXOP). The EDCF mode of operation also does not provide any QoS guarantees to the different classes of traffic. Different applications specify different QoS requirements which need to be provided to the users.

A survey of the existing literature on performance evaluation and admission control in wireless ad hoc networks is as follows (see the list of references appended hereto): In [3], Bianchi developed a discrete time Markov chain (DTMC) based approach to model the back-off stage and the back-off counter value. The DTMC model provided the throughput under saturated conditions. In [4], Carvalho and Aceves used the model developed by Bianchi in [3] to model the delay in single hop 802.11 networks. An expression for the mean and the variance for the "idle time" of a node was derived. The "idle time" was defined as the time a node spends in back-off. The authors in [4] also considered a saturated traffic model or an "always on" model (as in [3]).

Admission control in the DCF and EDCF modes of wireless local area network (WLAN) have been studied in [5]-[7]. In [5], Kanodia et al presented a dynamic priority assignment algorithm in which each node exchanges the priority index of the packet currently under transmission and also the priority index at the head of line or the packet next to the one currently under transmission. The other nodes use this information to update their priority indices. The priority indices are then dynamically varied depending on the time spent by a packet in the system and the number of hops traversed. The mechanism provided in [5] is a modified back-off procedure based on the node priorities. In [6], Valee and Li applied the notion of service curves and used probing packets to predict the service curves. The service curves were obtained by the probing packets by using a moving average of the delay undergone by k waiting packets. However, the approach in [6] was a reactive approach because there was no effective prediction of the channel behavior. In [7], Kuo et al considered the EDCF mode of operation and presented an admission control policy to meet mean delay requirements. An estimate of the mean delay was made using a G/G/1 queuing model. It was found that the admission control procedure was highly conservative and resulted in under utilization of system resources. Also the procedure does not help in meeting delay bound requirements of real time traffic. In [8], Pong and Moors present an admission control approach for differentiated services in WLAN with the IEEE 802.11e EDCF. The contention window sizes were modified based on the throughput requirements of the flows and for each flow, the probability of the collision (and thus throughput degradation) was computed using an exponential weighted average technique.

QoS provisioning in WLAN has been studied widely, some of the studies were mentioned above. While most studies in the current literature consider the infrastructure mode of operation, there are not many efficient mechanisms to provide QoS in the ad hoc mode. The existing literature on admission control in ad hoc networks provides means for exchanging information on the priorities associated with the packets currently under transmission and the packets in the head of line of the nodes. The priority indices of the packets are decided based on the access categories. There are very few studies on providing statistical QoS to packets belonging to different applications. Further, most studies consider the saturated traffic conditions and there are no efficient mechanisms that take into consideration the realistic on-off traffic models and that exploit the properties of session arrival processes.

SUMMARY OF THE INVENTION

An object of the invention is to provide methods and system for admission control and scheduling in ad hoc wireless networks.

One of the methods for admission control in ad hoc networks would be to predict the probability of QoS violation for different classes of traffic and admit only those calls that have a lower probability of QoS violation. Once a session is admitted, we present a scheduling policy for the packets belonging to the sessions. We once again compute the probability of QoS violation for each packet belonging to an admitted session, and use the computed probabilities to obtain the scheduling policy.

Accordingly, exemplary embodiments of the present invention include, but are not limited to the following:

a method for admission control in wireless ad hoc networks in which the node estimates the probability of delay violation for VoIP and MPEG type traffic in a single hop and admits a call only if the probability of delay violation is below a specified threshold, a method as above where a node estimates the probability of delay violation for VoIP and MPEG type traffic over two hop links and admits a session-only if the probability of delay violation is below a specified threshold, a method for admission control in wireless ad hoc networks in which a node estimates the mean one hop and two hop delays for HTTP type traffic and admits only those flows whose estimated mean delay is below a specified limit, a method as above in which nodes estimate the mean throughput for FTP type traffic and admit only those flows whose estimated throughput is above a specified limit, a method for scheduling admitted MPEG and VoIP type flows in wireless ad hoc networks, in which nodes estimate the delay violation statistics for every packet and schedule the packet whose percentage of delay violation is closest to the tolerable threshold a method as above, in which nodes estimate the mean delay statistics of packets belonging to HTTP type flows and throughput violation statistics of packets belonging to FTP type flows, and schedule packets whose percentage deviation from the required threshold is minimum, Certain exemplary implementations the present invention further comprise necessary modifications in the IEEE 802.11 system to incorporate the mechanisms described above.

According to another exemplary embodiments of the present invention there is provided a method for admission control and scheduling in ad hoc wireless networks for different class of flows C1, C2 and C3 where said admission control mechanism evaluates the probability of QoS violation and admits those calls whose probability of QoS violation is below a specified threshold wherein:
  (a) admission Control for Class C1 evaluates the probability as where destination node is a one-hop neighbor of the source node;
  (b) admission Control for Class C1 evaluates the probability as where source and destination nodes are not one hop neighbors;
  (c) admission Control for Class C2 and class C3 flows evaluates the average or mean delay requirement and a requirement on the rate;
  (d) scheduling class C1 flows when admitted flows violate the QoS requirements; and
  (e) scheduling class C2 and class C3 flows; provided
  (i) C1 represent flows such as voice over IP (VoIP) and streaming video;
  (ii) C2 represent flows such as hypertext transfer protocol (HTTP) and web browsing;
  (iii) C3 represent flows such as file transfer protocol (FTP) and downloads.

The other objects, features and advantages of the embodiments of the present invention will be apparent from the ensuing description of the exemplary embodiments of the present invention taken in conjunction with the accompanying drawings.

BRIEF DESCRIPTION OF ACCOMPANYING DRAWINGS

Figure 3:
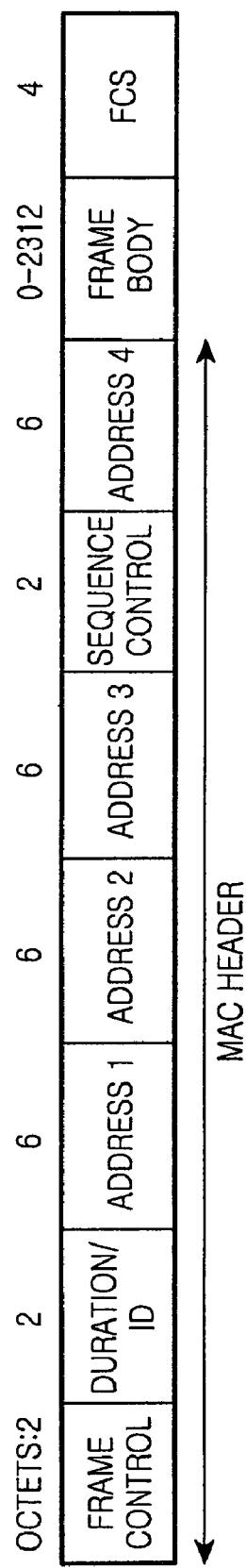
Figure 4:
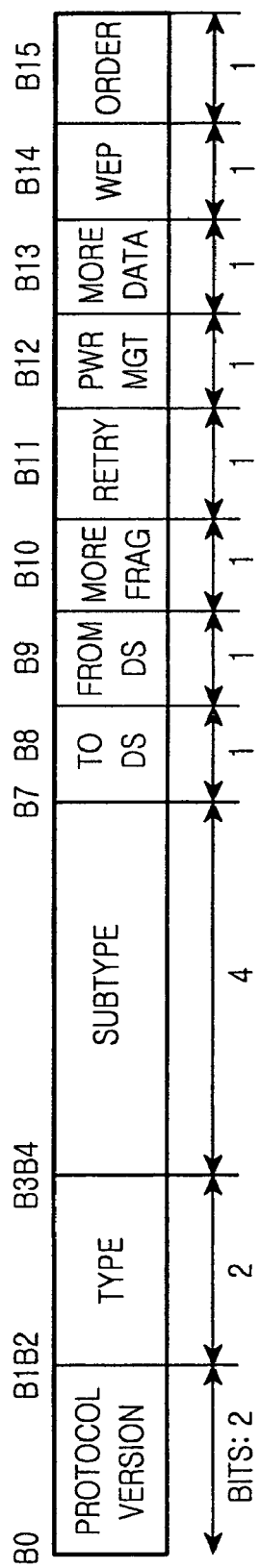

FIG. 1 illustrates a typical Wireless Ad hoc Network.
FIG. 2 is a flow chart for the admission control and scheduling mechanisms.
FIG. 3 illustrates a MAC frame format in IEEE 802.11.
FIG. 4 shows the Frame Control Field Format.
FIG. 5 is a table showing valid "Type" and "Subtype" combinations.

DETAILED DESCRIPTION OF EXEMPLARY EMBODIMENTS

An exemplary embodiment of the present invention will now be explained with reference to the accompanying drawings. It should be understood however that the disclosed embodiment is merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. In the following, description well-known or conventional details have been omitted for clarity and conciseness.

In many types of wireless networks, IP packets are segmented to MAC packets before they are transmitted over the air interface by the STA's. For the purpose of QoS negotiation, we classify flows as follows:

Class C1: For flows such as voice over IP (VoIP) and streaming video that have very stringent requirements over delay bound and jitter. These flows may also specify their required rate.

Class C2: For flows such as hyper text transfer protocol (HTTP) and web browsing which specify an average delay requirement and a requirement on the rate.

Class C3: For flows such as file transfer protocol (FTP) and downloads which specify a requirement of rate alone.

Class C4: For flows which have no QoS requirements (called best effort flows).

We make the following assumptions in the system:
Each node knows the two-hop network topology, i.e., each node knows its immediate and two-hop neighboring nodes. This can be done by observing the RTS messages over a period of time.

The session arrival process for each class of traffic is as follows [9], that is, a Poisson process for session arrivals of traffic belonging to any of the four classes specified above.

For every newly arriving session at any node, the destination is either a one hop neighbor or a node which is two or more hops away. The probability of a node transmitting data to another node which is three or more hops away is very small (albeit non-zero). This assumption follows from the fact that IEEE 802.11 WLAN presents problems like TCP instability and unfairness in multi-hop wireless networks and hence are not suitable for communication between nodes that are more than two hops away from each other [10].

The system supports very limited mobility. This is also a valid assumption since the IEEE 802.11 system is designed for low mobility 0.

The limitation on the performance of a WLAN system in a multi-hop environment enables the proposal of admission control mechanisms for a two hop topology as presented in this invention. Since each node knows its one hop and two hop neighboring nodes and most of the data communication is expected to be between nodes which are one hop or two hop neighbors, we propose admission control mechanisms that evaluate the probability of QoS violation over two hop links and admit those calls whose probability of QoS violation is below a specified threshold.

Let $L_k^{(i)}$ be the length of the $i^{th}$ packet belonging to class Ck. The session arrival processes for all the classes are Poisson distributed. Let $\lambda^{(k)}$ be the arrival rate of class Ck packets. Therefore the total arrival rate in a node is given by $$\lambda = \sum_k \lambda^{(k)}.$$

Each node estimates $\lambda^{(k)}$ as follows. At any node, let the number of class Ck flows that arrived up to a window of time t be $\Lambda^{(k)}(t)$. The arrival rate, $\lambda^{(k)}$, can then be computed as $$\lambda^{(k)} = \frac{\Lambda^{(k)}(t)}{t}.$$

The class of each packet is identified from its header (this is explained in detail later) and the arrival rate is computed accordingly. For each class of service, If the channel capacity is C, then the packet holding time of the $i^{th}$ packet belonging to class Ck is given by $$\frac{L_k^{(i)}}{C}.$$

Let the mean packet length of a class Ck packet be $\overline{L^{(k)}}$ and the variance of the packet length of class Ck packet be $\sigma_k^2$.

In the WLAN DCF delay occurs due to queuing at each node, the transmission delay, that is, the packet holding time and the basic DCF channel sensing and back off mechanism. The delay on each link depends on the network load and the number of nodes in the network. Let the packet holding time distribution be F(t). It is noted that F(t) can be obtained from the packet length distribution, that is, the distribution of the packet length $L_k^{(i)}$. Let the distribution of the time involved in the DCF operation on each link (i.e., the DIFS+backoff+ freezing of the backoff counter) be B(t). B(t) can be obtained as the busy period of a G/G/1 queue. Thus each node can be modeled as a G/G/1 queue with service time distribution G(t)=F(t)*B(t), where * represents the Riemann-Stieljes convolution operation [11]. Therefore, the moment generating function of the service time, $\tilde{G}(s)$, is obtained from the Laplace-Stieljes transform of G(t). G(t) and $\tilde{G}(s)$ can be obtained by solving the Lindley's integral equation [11]. From $\tilde{G}(s)$, the moment generating function of the delay in a G/G/1 queue, $\tilde{D}(s)$, and hence, the characteristic function, $\tilde{D}(j\omega)$, can be obtained. It is observed that $\tilde{D}(s)$ is the Laplace-Stieljes transform of the one-hop delay distribution.

Mechanism I: Admission Control for Class C1 Flows

Class C1 flows have delay bound, jitter and rate requirements to be met, that is, each class C1 flow in a cell specifies the maximum delay bound that it can suffer, the maximum jitter bound and minimum rate that is required to receive or transmit data. When a MAC packet arrives at a node, the packet carries along with it the packet length, the delay suffered and the destination address. Each class C1 packet also specifies the maximum delay it can tolerate, that is, the delay bound, $d_{bound}^{(C_k)}$, the jitter bound, $d_{jitter\_bound}^{(C_k)}$, bound, and the required rate, $R_{required}^{C_k}$. It is noted that in this case, k=1. Consider the first packet of a session arriving at a given node. In all further discussions throughout this document, we refer the node under consideration as the "current node". For admission control, the "current node" is the source node. If the destination node is an immediate neighbor to the current node, then the current node computes the probability $P_{delay\_viol}^{(C_k)} = Pr\{Delay > d_{bound}^{(C_k)}\}$ from $$P_{delay\_viol}^{(C_k)} = \frac{1}{2\pi} \int_{-\infty}^{\infty} \frac{\tilde{D}(j\omega) e^{j\omega d_{bound}^{(C_k)}}}{\omega} d\omega.$$

In wireless networks, statistical QoS guarantees are provided, e.g., it is desired to provide a delay bound violation of less than 5% for MPEG-n traffic, i.e., less than 5% of the MPEG-n flows suffer a delay greater than the value specified by the delay bound. In general for class k, it is desired that the fraction of flows violating the delay bound requirement be below a threshold $Threshold_{delay\_violated}^{(k)}$. Hence a call is blocked if $P_{delay\_viol}^{(C_k)} > Threshold_{delay\_violated}^{(k)}$. Class C1 flows may also specify a required rate $R_{required}^{C_k}$. It is essential to block calls that violate the rate requirement with a probability greater than a specified threshold $Threshold_{rate\_violated}^{(k)}$. The details of the means to compute the probability of violating the rate requirement, and its application to provide an admission control mechanism, are provided in mechanisms II and III.

Mechanism II: Admission Control for Class C1 Flows

In mechanism I, it was assumed that the destination node was a one-hop neighbor of the source node. This mechanism provides the admission control mechanism of the source node and the destination nodes are not one-hop neighbors. If the source and destination nodes are not one hop neighbors then the packets belonging to class C1 flows have to be traverse at least two hops. From $\tilde{D}(s)$, the Laplace-Stieljes transform of the n-hop delay distribution, $D^{(n)}(s)$, can be obtained as $(\tilde{D}(s))^n$. Therefore, the Laplace-Stieljes transform of the two-hop delay distribution, $D^{(2)}(s)$ can be obtained as $(\tilde{D}(s))^2$. The probability of a packet violating its delay bound requirements over two hops is then obtained as $$P_{delay\_viol}^{(C_k)} = \frac{1}{2\pi} \int_{-\infty}^{\infty} \frac{D^{(2)}(j\omega) e^{j\omega d_{bound}^{(C_k)}}}{\omega} d\omega.$$

If the destination node is not the one-hop neighbor of the source node, then the session is blocked if $P_{delay\_viol}^{(C_k)} > Threshold_{delay\_violated}^{(k)}$. Class C1 flows may also specify a required rate $R_{required}^{C_k}$. It is essential to block calls that violate the rate requirement with a probability greater than a specified threshold $Threshold_{rate\_violated}^{(k)}$. The details of the means to compute the probability of violating the rate requirement, and its application to provide an admission control mechanism, are provided in mechanism III.

Mechanism III: Admission Control for Class C2 and Class C3 Flows

Class C2 flows specify requirements on mean delay and average rate. Let $d_{mean\_bound}^{(C_k)}$ bound be the mean delay bound for class Ck flows. Again, it is noted that in this case $C_k = C_2$. However, exemplary embodiments of the present invention are valid for any class of service which has similar requirements. From the expression and values of $\tilde{D}(s)$, obtained as specified in mechanism I, the average time spent in the DCF processing, E[D], and the second moment, E[D²] can be obtained as $$E[D] = \lim_{s \to 0} \frac{d\tilde{D}(s)}{ds} \text{ and } E[D^2] = \lim_{s \to 0} \frac{d^2\tilde{D}(s)}{ds^2}.$$

Thus the variance of the time spent in DCF operations, $\sigma_D^2$, can be obtained as $\sigma_D^2 = E[D^2] - (E[D])^2$. Since each node in the system can be modeled as an M/G/1 queue, the mean delay of a packet, $D_{mean}$, of any class can be obtained using the Pollackzek-Khinchine mean value formula [11] to be $$D_{mean} = E[D]\left[1 + \frac{\rho}{2(1-\rho)}(1 + C_D^2)\right],$$

where $\rho = \lambda E[D]$ is the load at the node and $$C_D^2 = \frac{\sigma_D^2}{(E[D])^2}$$

is the square of the co-efficient of variation. When a node has class C2 traffic to transmit to its single-hop neighbor, the node computes the mean delay based on the load conditions and blocks the call if the mean delay, $D_{mean}$, is above the specified threshold, $d_{mean\_bound}^{(C_k)}$. If the destination node is two or more hops away from the source node, then the call is blocked if $D_{mean} > d_{mean\_bound}^{(C_k)}$. Class C2 flows may also specify a minimum required rate. Class C3 flows have requirements of required rate. Let the average length of a packet if class Ck be $\overline{L}_k$. Let the rate required by class Ck traffic be $R_{required}^{C_k}$. It is observed that in this case, $C_k = C_3$. For class Ck flows, the obtained rate $$R^{(C_k)} = \frac{\overline{L}_k}{D_{mean}},$$

where $D_{mean}$ is the mean delay which can be obtained as above. To ensure $R^{(C_k)} \geq R_{required}^{C_k}$, $$D_{mean} \leq \frac{\overline{L}_k}{R^{(C_k)}}.$$

Therefore the mean delay of C2 flows for a given load, $D_{mean}$ should satisfy $$D_{mean} \leq \min\left(d_{mean\_bound}^{(C_2)}, \frac{\overline{L}_k}{R^{(C_k)}}\right)$$

if the destination is a one hop neighbor of the source node and should satisfy $$D_{mean} \leq \frac{1}{2}\min\left(d_{mean\_bound}^{(C_2)}, \frac{\overline{L}_k}{R^{(C_k)}}\right).$$

This mechanism can also be used for class C3 flows that have a rate requirement.

Scheduling Admitted Flows

In Mechanisms I-III, we discussed admission control mechanisms for flows based on the QoS requirements. It is possible that the admitted flows violate the QoS requirements. Hence it is essential to devise efficient scheduling mechanisms for the admitted flows. The admitted flows consist of active bursts called packet calls. We propose in mechanisms IV and V, mechanisms for scheduling flows belonging to different classes. To schedule packets belonging to flows of different classes, we compute $p_i^{(C_k)}$, which is the probability of QoS violation for the $i^{th}$ packet that belongs to a flow of class Ck. This probability is computed assuming that the packets would be served in the first come first served (FCFS) discipline. The packets belonging class Ck flows are then partitioned into two subsets $S_{QoS\text{-}Satisfied}^{(k)}$ and $S_{QoS\text{-}Violate}^{(k)}$. The set $S_{QoS\text{-}Satisfied}^{(k)}$ is the set of packets that belong to class Ck flow for which $p_i^{(C_k)}$ is below a specified threshold when served according to an FCFS discipline and $S_{QoS\text{-}Violate}^{(k)}$ is the set of packets that belong to class Ck flow for which $p_i^{(C_k)}$ exceeds the required threshold when served according to an FCFS discipline. Among the packets belonging to the set $S_{QoS\text{-}Violate}^{(k)}$, consider the subset of packets $\tilde{S}_{QoS\text{-}Violate}^{(k)} \subset S_{QoS\text{-}Violate}^{(k)}$ such that $\tilde{S}_{QoS\text{-}Violate}^{(k)} = \{i \in S_{QoS\text{-}Violate}^{(k)} | p_i^{C_k} < P^{(k)} < 1\}$. The subset $\tilde{S}_{QoS\text{-}Violate}^{(k)}$ contains the packets that may violate the delay bound requirement but can be made to meet the requirements by efficient scheduling policies. The motivation behind forming such a partition is as follows: It is not necessary to compensate packets (belonging to flows) which satisfy their QoS requirements even when an FCFS scheduling policy is adopted. However, packets which may fail to meet the QoS requirements when served according to an FCFS policy are compensated by scheduling. Among the packets that require compensation, we discard those packets which may violate the requirements by a large probability, P and compensate only the other packets.

Mechanism IV: Scheduling Class C1 Flows

Consider the admitted packets belonging to class C1 flows. Let the delay undergone by a packet be d*. The probability of the $i^{th}$ class C1 packet exceeding the delay bound, $p_i^{(C_1)}$, can be obtained as $p_i^{(C_k)} = \Pr\{\text{Delay} > d_{bound}^{(C_k)} - d^*\}$, and this expression is computed as explained in mechanism I if the destination node is a one hop neighbor to the current node, or mechanism II if the destination node is two or more hops away from the current node. Similarly, class C1 packets also need to satisfy jitter requirements. Let the delay undergone by the $(i-1)^{th}$ packet of the $j^{th}$ class C1 flow be $d_{ij}^{(k)}$. The jitter violation probability can then be obtained as $p_i^{(C_k)} = \Pr\{\text{Delay} > d_{jitter}^{(C_k)} + d_{ij}^{(k)}\}\Pr\{\text{Delay} > d_{ij}^{(k)}\} + \Pr\{\text{Delay} > d_{ij}^{(k)} - d_{jitter}^{(C_k)}\}\Pr\{\text{Delay} \leq d_{ij}^{(k)}\}$. Consider the packets i at a node that satisfy $p_i^{(C_k)} \leq \min(\text{Threshold}_{delay\_violated}^1, \text{Threshold}_{jitter\_violated}^1)$ Let $S_{QoS\text{-}Satisfied}^{(k)}$ be the set of packets that satisfy $p_i^{(C_k)} \leq \min(\text{Threshold}_{delay\_violated}^1, \text{Threshold}_{jitter\_violated}^1)$ and let $S_{QoS\text{-}Violate}^{(k)}$ be the set of packets for which do not satisfy $p_i^{(C_k)} \leq \min(\text{Threshold}_{delay\_violated}, \text{Threshold}_{jitter\_violated}^1)$. Form the subset $\tilde{S}_{QoS\text{-}Violate}^{(k)}$ as mentioned earlier and among the subset of packets $\tilde{S}_{QoS\text{-}Violate}^{(k)}$ compute the expression $$\tau_i^{(k)} = 100 \max\left(\frac{p_i^{(C_k)} - \text{Threshold}_{delay\_violated}^1}{\text{Threshold}_{delay\_violated}^1}, \frac{p_i^{(C_k)} - \text{Threshold}_{jitter\_violated}^1}{\text{Threshold}_{jitter\_violated}^1}\right).$$

This gives the percentage by which the packet may exceed the delay bound or the jitter bound when served according to an FCFS policy. The packet with the highest value of $\tau_i^{(k)}$ is then scheduled to be transmitted.

Mechanism V: Scheduling Class C2 and Class C3 Flows

As mentioned earlier, packets belonging to class C2 flows need to satisfy mean delay and throughput requirements. Let $N^{(k)}(t)$ be the number of class Ck packets that arrived at a node upto time window of size t. The mean delay of class Ck packets upto a time window of size t is then given by $$\overline{D}_N^{(k)}(t) = \frac{1}{N^{(k)}(t)} \sum_{j=1}^{N^{(k)}(t)} d_j^{(C_k)}.$$

The mean delay can be computed as a moving average, i.e., $$\overline{D}_N^{(k)}(t) = \frac{N^{(k)}(t)-1}{N^{(k)}(t)} \overline{D}_{N-1}^{(k)}(t) + \frac{1}{N^{(k)}(t)} d_{N^{(k)}(t)}^{C_k}.$$

Hence the probability of a class C2 packet violating the mean delay bound requirement, $p_i^{(C_k)}$, can then be obtained as $p_i^{(C_k)} = \Pr\{d_{N^{(k)}(t)}^{C_k} > N^{(k)}(t)*\text{Mean\_delay\_bound}^{(C_k)} + [N^{(k)}(t)-1]\overline{D}_{N-1}^{(k)}(t)\}$. As mentioned in mechanism III, the rate requirement can be mapped into a mean delay requirement and hence the probability of rat violation can also be computed. As in mechanism IV, we form the set $S_{QoS\text{-}Violate}^{(k)}$ and the subset $\tilde{S}_{QoS\text{-}Violate}^{(k)}$. Among the packets that belong to the set $\tilde{S}_{QoS\text{-}Violate}^{(k)}$, we compute $$\tau_i^{(k)} = 100$$
$$\max\left(\frac{p_i^{(C_k)} - Threshold_{mean\_delay\_violated}^2}{Threshold_{mean\_delay\_violated}^2}, \frac{p_i^{(C_k)} - Threshold_{rate\_violated}^2}{Threshold_{rate\_violated}^2}\right).$$

Similarly, for class C3 flows the term $$\tau_i^{(k)} = 100\left(\frac{p_i^{(C_k)} - Threshold_{rate\_violated}^3}{Threshold_{rate\_violated}^3}\right)$$

can be obtained.

In Mechanisms IV and V we proposed mechanisms which compensate packets that may violate the QoS requirements. However, compensating only those packets that may violate the QoS requirements may lead to the increase in the probability of other "well behaved" packets exceeding the threshold. Therefore, it is more efficient if the set $\tilde{S}_{QoS\text{-}Violate}^{(k)}$ as follows: In addition to the packets as mentioned in mechanisms IV and V, the set $\tilde{S}_{QoS\text{-}Violate}^{(k)}$ is also made to include the following packets i such that $\epsilon^{(C_k)} \leq p_i^{(C_k)} \leq \min(Threshold_{delay\_violated}^1, Threshold_{jitter\_violated}^1)$ class C1 packets, $\epsilon^{(C_k)} \leq p_i^{(C_k)} \leq \min(Threshold_{mean\_delay\_violated}, Threshold_{rate\_violated}^2)$ and $\epsilon^{(C_k)} \leq p_i^{(C_k)} \leq Threshold_{rate\_violated}^3$. For these packets, $\tau_i^{(k)}$ is modified as follows:

$$\tau_i^{(k)} =$$
$$100 \max\left(\frac{Threshold_{delay\_violated}^1 - p_i^{(C_k)}}{Threshold_{delay\_violated}^1}, \frac{Threshold_{jitter\_violated}^1 - p_i^{(C_k)}}{Threshold_{jitter\_violated}^1}\right)$$

for packets belonging to class C1 flows, $$\tau_i^{(k)} = 100 \max$$
$$\left(\frac{Threshold_{mean\_delay\_violated}^2 - p_i^{(C_k)}}{Threshold_{mean\_delay\_violated}^2}, \frac{Threshold_{rate\_violated}^2 - p_i^{(C_k)}}{Threshold_{rate\_violated}^2}\right)$$

for packets belonging to class C2 flows and $$\tau_i^{(k)} = 100\left(\frac{Threshold_{rate\_violated}^3 - p_i^{(C_k)}}{Threshold_{rate\_violated}^3}\right)$$

for packets belonging to class C3 flows.

The intuition behind choosing $\tau_i^{(k)}$ as mentioned in Mechanisms IV and V is as follows: Flows belonging to different classes have different threshold. Packets may violate these thresholds with different probabilities. The proposed scheduling mechanisms compensate flows which violate the requirements but normalized to as a percentage of the QoS requirement, that is, different packets may violate the QoS requirements with different probabilities. However if we consider packets belonging to flows of different classes then the probabilities of QoS violations cannot be compared. Therefore, all the probabilities are normalized as a percentage of the required thresholds. Also it can be shown that the variance of $\tau_i^{(k)}$ is greater than that of $p_i^{(C_k)}$, thereby providing a better measure of QoS violation of the packet. The factor of 100 in the expressions for $\tau_i^{(k)}$ is to enable the representation of $\tau_i^{(k)}$ as a percentage and also provides large variance in the values of $\tau_i^{(k)}$, thus enabling better prioritization. $\tau_i^{(k)}$ is taken to be zero for best effort flows.

The flow chart for the admission control and scheduling mechanisms proposed above, is shown in FIG. 2.

Some practical considerations are considered herein in incorporating the admission control and scheduling mechanisms proposed in this invention, for QoS enhancements in IEEE 802.11 WLAN systems.

It was mentioned earlier in page Error! Bookmark not defined. that the class corresponding to each packet can be identified from the packet header. The mechanism to identify the class of each packet is as described below.

In the IEEE 802.11 WLAN system the MAC frame format appears as shown in FIG. 3.

The format for the 2 octets of "Frame Control" appearing in the MAC header shown in FIG. 3 is as shown in FIG. 4.

The valid combinations for the two bits corresponding to the "Type" and four bits corresponding to the "Subtype" are shown in FIG. 5. It is observed that for frame type 10 (corresponding to data frames), sub types 1000 to 1111 are left reserved. The subtypes 1000, 1001, 1010, 1011, 1100, 1101, 1110 and 1111 are used in the IEEE 802.11e specifications [2] to indicate QoS data, QoS data+CF-Ack, QoS data+CF-Poll, QoS data+CF-Ack+CF-Poll, QoS Null (no data), QoS CF_Ack (no data), QoS CF-Poll (no data), QoS CF-Ack+CF-Poll (no data), respectively. However, in certain exemplary embodiments of the present invention, we consider the basic IEEE 802.11 system and not the QoS enabled system. Therefore, we use the reserved Subtypes 1000, 1001, 1010 and 1011 of the type 10 (corresponding to data frames) to indicate class C1 VoIP, class C1 MPEG, class C2 and class C3 traffic, respectively. Subtype 0000 for type 10 is used to refer only to best effort traffic (class C4). However, to enable differentiation between the basic IEEE 802.11 system deploying the admission control and scheduling mechanism mentioned in this invention and the QoS enabled IEEE 802.11e system, we use the following distinction. The association request frame in the IEEE 802.11 WLAN systems 0 and IEEE 802.11e QoS enabled WLAN systems [2] contain an information element on the capabilities of each station that associates with an independent basic service set (IBSS). This can be used to differentiate between stations enabled with IEEE 802.11e QoS mechanisms and basic IEEE 802.11 stations enabled with the admission control mechanisms described in this invention.

It is also noted that the stations do not compute the probabilities mentioned in Mechanisms I-V on an online basis, that is, the stations are not required to compute the probabilities using the formulae given in mechanism I-V as and when each packet arrives. Instead, these computations are made offline for different discrete values of arrival rates of each class and the number of hops, and stored in a 4 dimensional matrix. This 4 dimensional matrix is then used as a look up table to obtain the QoS violation statistics for each type of flow or for each packet corresponding to a flow.

It is also observed that the admission control and scheduling mechanisms are applied only when the system reaches steady state.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a computer, mobile communication device, mobile server or a multi function device.

Although the present invention has been fully described in connection with certain exemplary embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

GLOSSARY OF TERMS AND THEIR DEFINITIONS

WLAN: Wireless Local Area Network
IBSS: Independent basic service set: A set of nodes which are part of the same WLAN operating in the ad hoc mode.
STA: A WLAN station
MAC: Medium Access Control
PCF: Point co-ordination function: The MAC protocol adopted in the infrastructure (centralized) mode of WLAN operation
DCF: Distributed co-ordination function: The MAC protocol adopted in the ad hoc (de-centralized) mode of WLAN operation
EDCF: Enhanced Distributed co-ordination function: The MAC protocol adopted in the ad hoc (de-centralized) mode of WLAN operation with QoS support
CSMA/CA: Carrier sense multiple access with collision avoidance, the multiple access mechanism used by STAs in the de-centralized mode to access the wireless medium
DIFS: DCF inter-frame spacing: The minimum interval the channel must be sensed idle by an STA before the back-off process begins
AIFS: Arbitration inter-frame spacing: The minimum interval the channel must be sensed idle by an STA before the back-off process begins in the EDCF mode of operation
TxOP: Transmission opportunity: The fraction of the channel bandwidth allocated to a node for transmitting a packet
G/G/1: A single server queue with a generalized distribution for the arrival process and a generalized distribution for the service times
M/G/1: A single server queue with a Poisson distribution for the arrival process and a generalized distribution for the service times
MMPP: Markov modulated Poisson Process: A Poisson process in which the arrival rates vary according to a Markov process
QoS: Quality of service

REFERENCES

[1] "Wireless Local Area Networks, Medium Access Control (MAC) and Physical Layer (PHY) Specifications," ANSI/IEEE Std 802.11, 1999 Edition.
[2] "Wireless LAN Medium Access Control (MAC) and Physical Layer (PHY) Specifications, MAC Quality of Service (QoS) Enhancements," IEEE P 802.11e/D 8.0, February 2004.
[3] G. Bianchi, "Performance analysis of the IEEE 802.11 distributed co-ordination function," *IEEE Journal on Selected. Areas in Communications*, vol. 18, no. 3, pp. 535-547, March 2000.
[4] M. Carvalho and J. J. Garcia-Luna-Aceves, "Delay analysis of IEEE 802.11 single hop networks," *International Conference on Network Protocols* (*ICNP '2003*), November 2003.
[5] V. Kanodia, C. Li, A. Sabharwal, B. Sadeghi and E. Knightly, "Distributed multi-hop scheduling and medium access with delay and throughput constraints," *Proc. ACM Mobile Communications Conference* (*MOBICOM '2001*), July 2001.
[6] S. Valee and B. Li, "Distributed call admission control for ad hoc networks," *IEEE Vehicular Technology Conference* (*VTC '2002*), September 2002.
[7] Y. Kuo, C. Lu, E. H. Wu and G. Chen, "An admission control strategy for differentiated services in IEEE 802.11," *IEEE Global Communications Conference* (*GLOBECOM '2003*), December 2003.
[8] D. Pong and T. Moors, "Call admission control for IEEE 802.11 contention access mechanism," *IEEE Global Communications Conference* (*GLOBECOM '2003*), December 2003.
[9] H. Choi and N. Moayeri, "Evaluation Procedure for the IEEE 802.16 MAC protocol," Document number IEEE 802.16.1mp-00/16.
[10] S. Xu and T. Saadawi, "Does the IEEE 802.11 MAC protocol work well in multi-hop wireless ad hoc networks?," *IEEE Communications Magazine*, pp. 130-137, June 2001.
[11] L. Kleinrock, *Queuing Systems: Volume I: Theory*, John Wiley and Sons, 1975.

I claim:

1. A method for controlling a call from a source node to a destination node in ad hoc wireless networks, the method comprising:

evaluating the first probability of QoS violation of the call if the destination node is a one-hop neighbor of the source node, and admitting the call when the first probability of QoS violation of the call is below a first threshold;

evaluating the second probability of QoS violation of the call that is different from the first probability of QoS violation based on a number of hop delay distributions if the destination node is not a one-hop neighbor of the source node, and admitting the call when the second probability of QoS violation of the call is below a second threshold; and scheduling packets of the admitted call when the admitted call violate a QoS requirements, wherein the call belongs to one of Class C1, Class C2, and Class C3, the Class C1 represent flows comprising at least one of voice over IP (VoIP) and streaming video, the Class C2 represent flows comprising at least one of hypertext transfer protocol (HTTP) and web browsing and the Class C3 represent flows comprising at least one of file transfer protocol (FTP) and downloads, wherein for the Class C1, each of the first probability of QoS violation and the second probability of QoS violation is evaluated by using a delay bound $d_{bound}^{(C_k)}$, and each packet of Class C1 specifies the maximum tolerated delay comprising at least one of the delay bound, $d_{bound}^{(C_k)}$, a jitter bound, $d_{jitter\_bound}^{(C_k)}$, and a required rate, $R_{required}^{C_k}$ and if the destination node is an immediate neighbor to the current node, then the current node computes the first probability of QoS violation, wherein for the Class C2 and the Class C3 the method further comprising;

evaluating a mean delay requirement and a requirement on the rate for the Class C2 and the Class C3 flows; and scheduling the Class C2 and the Class C3 flows based on the evaluated mean delay requirement and the requirement on the rate.

2. The method as claimed in claim 1, wherein for the Class C1, the first probability of QoS violation is evaluated as $$P_{delay\_viol}^{(C_k)} = \frac{1}{2\pi} \int_{-\infty}^{\infty} \frac{\tilde{D}(j\omega)e^{j\omega d_{bound}^{(C_k)}}}{\omega} d\omega.$$

3. The method as claimed in claim 2, wherein the first probability of QoS violation $P_{delay\_viol}^{(C_k)}$=Pr{Delay>$d_{bound}^{(C_k)}$} is calculated from $\tilde{D}(j\omega)$ as $$P_{delay\_viol}^{(C_k)} = \frac{1}{2\pi} \int_{-\infty}^{\infty} \frac{\tilde{D}(j\omega)e^{j\omega d_{bound}^{(C_k)}}}{\omega} d\omega.$$

4. The method as claimed in claim 2, wherein a fraction of flows violating the delay bound requirement is below a threshold Threshold$_{delay\_violated}^{(k)}$ and a call is blocked if $P_{delay\_viol}^{(C_k)}$>Threshold$_{delay\_violated}^{(k)}$ and Class C1 flows specify a required rate $R_{required}^{C_k}$ for that calls are blocked that violate the rate requirement with a probability greater than a specified threshold Threshold$_{rate\_violated}^{(k)}$.

5. The method as claimed in claim 2, wherein for Class C1, the second probability of QoS violation is evaluated as $$P_{delay\_viol}^{(C_k)} = \frac{1}{2\pi} \int_{-\infty}^{\infty} \frac{D^{(2)}(j\omega)e^{j\omega d_{bound}^{(C_k)}}}{\omega} d\omega.$$

6. The method as claimed in claim 5, wherein if the source and destination nodes are not one hop neighbors then the packets belonging to the Class C1 flows traverse at least two hops; wherein from $\tilde{D}(s)$, the Laplace-Stieljes transform of the n-hop delay distribution, $D^{(n)}(s)$, is obtained as $(\tilde{D}(s))^n$ and the probability of a packet violating its delay bound requirements over two hops is then obtained as $$P_{delay\_viol}^{(C_k)} = \frac{1}{2\pi} \int_{-\infty}^{\infty} \frac{D^{(2)}(j\omega)e^{j\omega d_{bound}^{(C_k)}}}{\omega} d\omega$$

and if the destination node is not the one-hop neighbor of the source node, then the session is blocked if $P_{delay\_viol}^{(C_k)}$>Threshold$_{delay\_violated}^{(k)}$ and the Class C1 flows specify a required rate $R_{required}^{C_k}$.

7. The method as claimed in claim 1, wherein for the Class C2 and the Class C3 flows the mean delay is given by $$D_{mean} = E[D]\left[1 + \frac{\rho}{2(1-\rho)}(1+C_D^2)\right] \text{ and the rate given by } R^{(C_k)} = \frac{L_k}{D_{mean}}.$$

8. The method as claimed in claim 7, wherein the average time spent in the DCF processing, E[D], and the second moment, E[D²] can be obtained as $$E[D] = \lim_{s \to 0} \frac{d\tilde{D}(s)}{ds} \text{ and } E[D^2] = \lim_{s \to 0} \frac{d^2\tilde{D}(s)}{ds^2};$$

wherein the variance of the time spent in DCF operations, $\sigma_D^2$, can be obtained as $\sigma_D^2 = E[D^2] - (E[D])^2$, each node in the system can be modelled as an M/G/1 queue, and the mean delay of a packet $$D_{mean} = E[D]\left[1 + \frac{\rho}{2(1-\rho)}(1+C_D^2)\right],$$

where ρ=λE[D] is the load at the node and $$C_D^2 = \frac{\sigma_D^2}{(E[D])^2}$$

is the square of the co-efficient of variation.

9. The method as claimed in claim 7, wherein when a node comprises the Class C2 traffic to transmit to its single-hop neighbor, the node computes the mean delay based on the load conditions and blocks the call if the mean delay $D_{mean}$ is above a threshold, $d_{mean\_bound}^{(C_k)}$ and when the destination node is two or more hops away from the source node, then the call is blocked if $D_{mean}$>$d_{mean\_bound}^{(C_k)}$.

10. The method as claimed in claim 7, wherein the Class C2 and Class C3 flows specify a minimum required rate for class Ck flows, the obtained rate $R^{(C_k)}$ $$R^{(C_k)} = \frac{L_k}{D_{mean}},$$

where $D_{mean}$ is the mean delay and $$R^{(C_k)} \geq R_{required}^{C_k}, D_{mean} \leq \frac{L_k}{R^{(C_k)}},$$

the mean delay of Class C2 flows for a given load, $D_{mean}$ satisfy $$D_{mean} \leq \min\left(d_{mean\_bound}^{(C_2)}, \frac{L_k}{R^{(C_k)}}\right)$$

if the destination is a one hop neighbor of the source node and satisfy $$D_{mean} \leq \frac{1}{2}\min\left(d_{mean\_bound}^{(C_2)}, \frac{L_k}{R^{(C_k)}}\right).$$

11. The method as claimed in claim 1, wherein scheduling the Class C1 flows when admitted calls violate the QoS requirements when the probability of the $i^{th}$ Class C1 packet exceeding the delay bound, $p_i^{(C_1)}$, is obtained as $p_i^{(C_k)} = \Pr\{\text{Delay} > d_{bound}^{(C_k)} - d^*\}$, where the delay undergone by the $(i-1)^{th}$ packet of the $j^{th}$ Class C1 flow be $d_{ij}^{(k)}$ and the jitter violation probability is then obtained as $p_i^{(C_k)} = \Pr\{\text{Delay} > d_{jitter}^{(C_k)} + d_{ij}^{(k)}\}\Pr\{\text{Delay} > d_{ij}^{(k)}\} + \Pr\{\text{Delay} > d_{ij}^{(k)} - d_{jitter}^{(C_k)}\}\Pr\{\text{Delay} \leq d_{ij}^{(k)}\}$ while considering the packets i at a node that satisfy $p_i^{(C_k)} \leq \min(\text{Threshold}_{delay\_violated}^1, \text{Threshold}_{jitter\_violated}^1)$ whereby $S_{QoS\text{-}Satisfied}^{(k)}$ is the set of packets that satisfy $p_i^{(C_k)} \leq \min(\text{Threshold}_{delay\_violated}^1, \text{Threshold}_{jitter\_violated}^1)$ and let $S_{QoS\text{-}Violate}^{(k)}$ be the set of packets for which do not satisfy $p_i^{(C_k)} \leq \min(\text{Threshold}_{delay\_violated}, \text{Threshold}_{jitter\_violated}^1)$ and form the subset $\tilde{S}_{QoS\text{-}Violate}^{(k)}$ and among the subset of packets $\tilde{S}_{QoS\text{-}Violate}^{(k)}$ compute the expression $$\tau_i^{(k)} = 100\max\left(\frac{p_i^{(C_k)} - \text{Threshold}_{delay\_violated}^1}{\text{Threshold}_{delay\_violated}^1}, \frac{p_i^{(C_k)} - \text{Threshold}_{jitter\_violated}^1}{\text{Threshold}_{jitter\_violated}^1}\right)$$

which gives the percentage by which the packet may exceed the delay bound or the jitter bound when served according to a First Come First Serve (FCFS) policy.

12. The method as claimed in claim 1, wherein scheduling Class C2 and Class C3 flows comprises delay of class Ck packets up to a time window of size t is given by $$\overline{D}_N^{(k)}(t) = \frac{1}{N^{(k)}(t)}\sum_{j=1}^{N^{(k)}(t)} d_j^{(C_k)}$$

where the mean delay is computed as a moving average, $$\overline{D}_N^{(k)}(t) = \frac{N^{(k)}(t)-1}{N^{(k)}(t)}\overline{D}_{N-1}^{(k)}(t) + \frac{1}{N^{(k)}(t)}d_{N^{(k)}(t)}^{C_k}$$

and the probability of a Class C2 packet violating the mean delay bound requirement, $p_i^{(C_k)}$, is the obtained as $p_i^{(C_k)} = \Pr\{d_{N^{(k)}(t)}^{C_k} > N^{(k)}(t) * \text{Mean\_delay\_bound}^{(C_k)} + [N^{(k)}(t)-1]\overline{D}_{N-1}^{(k)}(t)\}$.

13. The method as claimed in claim 12, wherein among the packets that belong to the set $\tilde{S}_{QoS\text{-}Violate}^{(k)}$, the method further comprises: computing $$\tau_i^{(k)} = 100\max\left(\frac{p_i^{(C_k)} - \text{Threshold}_{mean\_delay\_violated}^2}{\text{Threshold}_{mean\_delay\_violated}^2}, \frac{p_i^{(C_k)} - \text{Threshold}_{rate\_violated}^2}{\text{Threshold}_{rate\_violated}^2}\right);$$

and for Class C3 flows obtaining the term $$\tau_i^{(k)} = 100\left(\frac{p_i^{(C_k)} - \text{Threshold}_{rate\_violated}^3}{\text{Threshold}_{rate\_violated}^3}\right).$$

14. The method as claimed in claim 1, wherein flows comprising at least one of voice over IP (VoIP) and streaming video comprise a very stringent requirements over delay bound and jitter specify their required rate.

15. The method as claimed in claim 7, wherein flows comprising at least one of hypertext transfer protocol (HTTP) and web browsing specify a mean delay requirement and a requirement on the rate.

16. The method as claimed in claim 7, wherein flows comprising at least one of file transfer protocol (FTP) and downloads specify a requirement of rate alone.

17. The method as claimed in claim 1, wherein each node knows the two-hop network topology.

18. The method as claimed in claim 7, wherein the session arrival process for each class of traffic comprises a Poisson process.

19. The method as claimed in claim 1, wherein for every newly arriving session at any node, the destination comprises either a one hop neighbor or a node which is two or more hops away.

20. The method as claimed in claim 1, wherein the second probability of QoS violation of a node transmitting data to another node which is three or more hops away is very small.

21. The method as claimed in claim 1, wherein the system supports very limited mobility.

22. The method as claimed in claim 7, wherein the method comprises facilitating prediction of the each probability of QoS violation for different classes of traffic and admits only those calls that have a lower probability of QoS violation.

23. The method as claimed in claim 1, wherein once a session is admitted, a scheduling policy for the packets belonging to the sessions is formulated.

24. The method as claimed in claim 1, wherein once again the probability of QoS violation for each packet belonging to an admitted session is computed, the computed probabilities are used to obtain the scheduling policy.

* * * * *